(12) United States Patent
Lawrence et al.

(10) Patent No.: US 11,815,629 B2
(45) Date of Patent: *Nov. 14, 2023

(54) LIDAR SCAN REDUCTION

(71) Applicant: Intel Corporation, Santa Clara, CA (US)

(72) Inventors: Sean J. Lawrence, Bangalore (IN); Arvind S, Bangalore (IN)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/673,483

(22) Filed: Feb. 16, 2022

(65) Prior Publication Data

US 2022/0171034 A1    Jun. 2, 2022

Related U.S. Application Data

(63) Continuation of application No. 16/019,998, filed on Jun. 27, 2018, now Pat. No. 11,280,886.

(51) Int. Cl.
  *G01S 7/481* (2006.01)
  *G01S 17/93* (2020.01)
  *G01S 17/89* (2020.01)

(52) U.S. Cl.
  CPC .......... *G01S 7/4817* (2013.01); *G01S 7/4812* (2013.01); *G01S 7/4816* (2013.01); *G01S 17/89* (2013.01); *G01S 17/93* (2013.01)

(58) Field of Classification Search
  CPC ...... G01S 7/4817; G01S 7/4816; G01S 17/89; G01S 17/93; G01S 7/4812; G01S 1/7038; G01S 5/0027; G01S 5/16; G01S 7/48; G01S 17/42

USPC ....................................................... 356/4.01
See application file for complete search history.

(56) References Cited

U.S. PATENT DOCUMENTS

| 9,024,810 B2 | 5/2015 | Lohbihler |
| 11,280,886 B2 * | 3/2022 | Lawrence ............... G01S 17/42 |
| 2020/0025885 A1 | 1/2020 | Lawrence et al. |

OTHER PUBLICATIONS

Peppiatt, "Here's exactly how the HTC vive work", retrieved from https://www.gadgetdaily.xyz/heres-exactly-how-the-htc-vive-works/, on Apr. 25, 2018, 4 pages.
Buckley, "This is how Valve's Amazing Lighthouse tracking Technology works", retrieved from https://gizmodo.com/this-is-how-valve-s-amazing-lighthouse-tracking-te, on Apr. 25, 2018, 4 pages.
United States Patent and Trademark Office, "Notice of Allowance," issued in connection with U.S. Appl. No. 16/019,998, dated Nov. 12, 2021, 9 pages.

(Continued)

*Primary Examiner* — Daniel L Murphy
(74) *Attorney, Agent, or Firm* — HANLEY, FLIGHT & ZIMMERMAN, LLC

(57) ABSTRACT

Systems, apparatus, articles of manufacture, and methods to reduce a scan for identifying physical objects are disclosed. An example system includes a light source to broadcast a light signal, a window adjuster to set a scan parameter for the light signal, and a transceiver to receive communication indicative of a physical position of a mobile unit. In the example system, the window adjuster is to adjust the scan parameter based on the physical position.

20 Claims, 8 Drawing Sheets

(56) References Cited

OTHER PUBLICATIONS

United States Patent and Trademark Office, "Ex parte Quayle action," issued in connection with U.S. Appl. No. 16/019,998, mailed on Sep. 2, 2021, 8 pages.
United States Patent and Trademark Office, "Notice of Non-compliant," issued in connection with U.S. Appl. No. 16/019,998, dated Aug. 6, 2021, 3 pages.
United States Patent and Trademark Office, "Non-final office action" issued in connection with U.S. Appl. No. 16/019,998, dated Mar. 29, 2021, 10 pages.

* cited by examiner

LIDAR SCAN REDUCTION

RELATED APPLICATION

This patent arises from a continuation of U.S. patent application Ser. No. 16/019,998, which was filed on Jun. 27, 2018. Priority is claimed to U.S. patent application Ser. No. 16/019,998. U.S. patent application Ser. No. 16/019,998 is hereby incorporated by reference in its entirety.

FIELD OF THE DISCLOSURE

This disclosure relates generally to LiDAR, and, more particularly, to LiDAR scan reduction.

BACKGROUND

Light detection and ranging (LiDAR) is a surveying technology that uses pulses of laser light to determine distances and make three-dimensional representations of environments. A station or lighthouse sends out pulses of laser light across a scannable space. The laser light is reflected off objects in the environment and received at the station, which uses the wavelengths and times of receipt of the reflected light to map the environment. The scannable space is defined by the capabilities of the station. Typical stations scan the entirety of the scannable space.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

LiDAR surveying technology uses signals from one or more light sources such as, for example lasers, to make three-dimensional (3-D) maps or representations of physical areas. LiDAR has many applications including, for example, in geography, geology, forestry, virtual reality, gaming, archaeology, autonomous vehicles, and agriculture. In the virtual reality and gaming context, a player, gamer, or user may have a head-mounted display (HMD) or other mobile unit that moves with the user around a physical area or space. LiDAR is used to track the position of the mobile unit and, thus, the user in the physical space. The position of the user is then mapped into a virtual environment. LiDAR lighthouses or base stations typically scan the whole physical space to determine the position of the mobile unit and user in the physical space. Often the LiDAR base stations are battery powered. Optimization, for example a reduction, in the area scanned or duty cycle of the laser will provide direct benefit by reducing the power consumed and increasing battery life. Disclosed herein are systems, apparatus, articles of manufacture, and methods to reduce a LiDAR scan to provide significant power saving.

Typical LiDAR systems implement full scan cycles to completely scan a physical area. A mobile unit and user are positioned in one portion of the physical area, and a scan of the entire physical area results in unnecessary scanning of the physical area where the user is not present, resulting in unnecessary power expenditure. The examples disclosed herein optimize the scanning by reducing the amount of physical area scanned by focusing the scan to an area of interest, such as for example, the area or subspace in which the user is present or expected to be present. Reducing the scan area to the area of interest also reduces the scan time. In examples disclosed herein, the mobile unit communicates position information via a back channel to the LiDAR base station. With the knowledge of the position of the mobile unit and the user, the base station can adjust the scan window and project the light signal (e.g., laser beam) only in a window around the position of the mobile unit. That is, the base station scans only a subspace of the physical area instead of the entire physical area based on the position information from the mobile unit. The optimized LiDAR scanning results in longer battery life of LiDAR base station.

Figure 1:
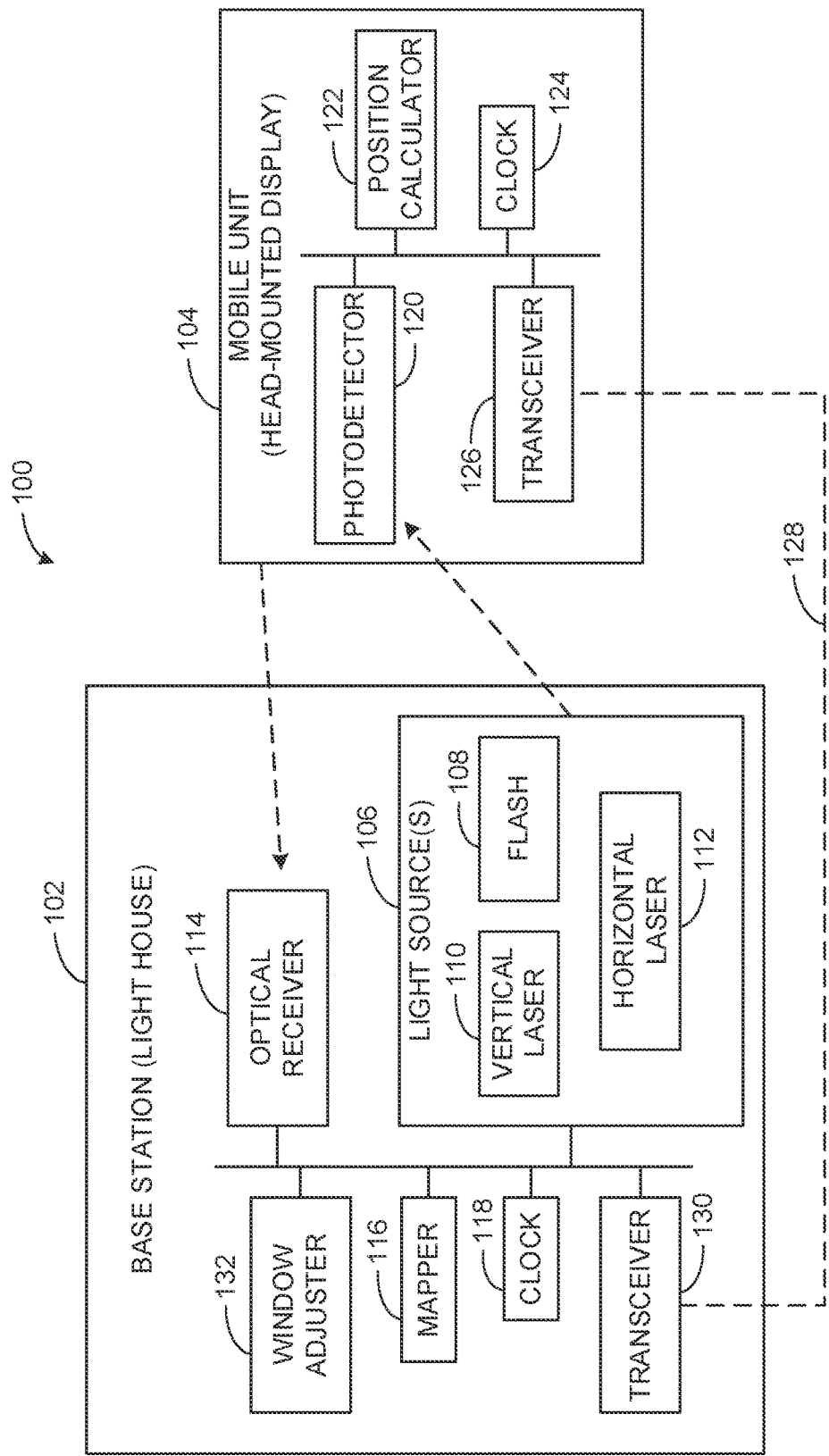
FIG. 1 is a block diagram of an example LiDAR scan reduction system in accordance with the teachings of this disclosure.

FIG. 1 is a block diagram of an example LiDAR scan reduction system 100 in accordance with the teachings of this disclosure. The example system includes a base station 102 and a mobile unit 104. In some examples, the base station 102 is known as a light house as it is the source of light signals that are used to detect the mobile unit 104. In some examples, the mobile unit 104 is a head-mounted display such as, for example, in a virtual reality or gaming environment. The mobile unit 104 also represents a player, gamer, or other user or subject, depending on the LiDAR application.

The base station 102 includes one or more means of broadcasting a light signal such as, for example, one or more light sources 106. In this example the light sources 106 include, for example, a flash 108, a vertical laser 110, and a horizontal laser 112. The flash 108 can include, for example, one or more light-emitting diodes (LEDs). In some examples, the flash 108 is an array of LEDs. In other examples, other light sources may be used to produce a light signal. The flash 108 emits light periodically, and the time between the light emissions from the flash 108 sets the scan cycle of the base station 102. During a scan cycle, the vertical laser 110 emits a laser pulse over a vertical duty cycle that corresponds to a vertical sweep of the physical area being scanned by the base station 102. In some examples, the vertical laser 110 is mounted on a cylinder that rotates about a horizontal axis. The vertical duty cycle is defined by an amount of time the vertical laser is activated during rotation of the cylinder, an angular velocity, and/or an arc. Similarly, during a scan cycle, the horizontal laser 112 emits a laser pulse over a horizontal duty cycle that corresponds to a horizontal sweep of the physical area being scanned by the base station 102. In some examples, the horizontal laser 112 is mounted on a cylinder that rotates about a vertical axis. The horizontal duty cycle is defined by an amount of time the horizontal laser is activated during rotation of the cylinder, an angular velocity, and/or an arc. In some examples, the vertical laser 110 and the horizontal laser 112 operate the respective vertical duty cycle and the horizontal duty cycle in sequence. Also, in some examples, the vertical duty cycle and the horizontal duty cycle are the same, and in other examples, the vertical duty cycle and the horizontal duty cycle are different.

In some examples, the light signals are non-visible light including, for example ultra-violet and/or infra-red light. In other examples, other wavelengths in the electro-magnetic spectrum may be used.

In some examples, the light signals from the light sources 106 are reflected off objects in the physical area including, for example the mobile unit 104, and the reflected light signals are detected by means for detecting a light signal including an optical receiver 114 of the base station 102. The optical receiver 114 can communicate the reflected light signals to means for mapping a physical area including, for example, a mapper 116 that develops a map of the physical area. Specifically, in some examples, a pulse of light is emitted from the light source 106 and the time of emission is recorded by, for example, a clock 118 in the base station 102. The reflection of that pulse is detected by the optical receiver 114, and the time of receipt of the reflected light signal is recorded by the clock 118. The mapper 116 uses the constant speed of light, the time data, and the position and orientation of the optical receiver 114 to determine the XYZ coordinate of the reflective surface.

In disclosed examples, light signals from the light sources 106 are also detected by additional means for detecting a light signal that include, for example, a photodetector 120 of the mobile unit 104. In some examples, the photodetector 120 includes one or more photodiodes. The photodetector 120 is illuminated by the light signals from the light sources 106 and converts the light signals into data related to the light signals. The mobile unit 104 also includes a clock 124 that records time data related to times at which light signals are detected by the photodetector 120. The mobile unit 104 includes means for determining a physical position of the mobile unit 104 including, for example, a position calculator 122 that uses the data related to the light signals and data from the clock 124 to determine a position of the mobile unit 104 in the physical area. For example, the clock 124 counts the time between when a light signal from the flash 108 is received at the photodetector 120 and when light signals are received at the photodetector 120 from the vertical laser 110 and the horizontal laser 112. The position calculator 122 uses the timing data from the clock and the placement of the photodetector 120 on the mobile unit 104 to determine the exact position of the mobile unit 104 relative to the base station 102 in the physical area. Also, in some examples, the position calculator 122 can leverage data from a positioning system such as the Global Positioning System (GPS) to determine position data.

When the position calculator 122 has determined the physical position of the mobile unit 104, the mobile unit 104 uses a transceiver 126 to communicate the position information via a back channel or other communications channel 128 to a transceiver 130 at the base station 102. In some examples, the communications channel 128 is a wireless communications channel such as, for example, a WiFi communications channel. In some examples other low-power communications such as Bluetooth or Zigbee are used. Other wired or wireless communications may be used.

The base station 102 also includes means for setting a scan parameter for the light signal including, for example, a window adjuster 132. The window adjuster 132 uses the position information received at the transceiver 130 from the mobile unit 104 to adjust a scan parameter of the base station 102 for the light signal. In some examples, the scan parameter corresponds to the vertical duty cycle of the vertical laser 110 and/or the horizontal duty cycle of the horizontal laser 112. The scan parameter defines a physical area to be scanned, and the window adjuster 132 is to adjust the scan parameter to define a subspace of the physical area to be scanned. For example, with the position of the mobile unit 104 known, the window adjuster 132 can change the vertical duty cycle to scan a vertical space in the physical area that includes the position of the mobile unit 104 and a vertical window about the physical position that is less than the entire vertical space of the physical area. Additionally or alternatively, the window adjuster 132 can change the horizontal duty cycle to scan a horizontal space in the physical area that includes the position of the mobile unit 104 and a horizontal window about the physical position that is less than the entire horizontal space of the physical area. Thus, the window adjuster 132 reduces the scan area and scan time, which increases power savings.

The base station 102 continues to operate scan cycles with the light sources 106. The mobile unit 104 provides updated position information via the communications channel 128 as the mobile unit 104 moves in the physical area. The window adjuster 132 processes the updated position information to determine if scan parameters are to be adjusted and adjusts the parameters based on updated position information from the mobile unit 104.

In some examples, the window adjuster 132 adjusts one of the scan parameters while maintaining another. For example, a user in a gaming context may have the mobile unit 104 (e.g., a head-mounted display) at approximately the same vertical position in the physical area during a game because the user is the same height. In this example, the window adjuster 132 may maintain the same or a relatively same vertical duty cycle because the vertical position of the mobile device 104 is not expected to change or to change substantially. The horizontal position of the mobile device 104 may have a greater variance in this example. Thus, the window adjuster 132 may adjust the horizontal duty cycle more frequently and/or to cause a wider horizontal window during the scan cycle. Thus, in this example, the vertical duty cycle and the horizontal duty cycle may have different values. Further, in this example, the vertical duty cycle may be smaller than the horizontal duty cycle as there is less expectation for a change in vertical position than a change in horizontal position.

In other examples, the window adjuster 132 may maintain the same or a relatively same horizontal duty cycle because the horizontal position of the mobile device 104 is not expected to change or to change substantially. The vertical position of the mobile device 104 may have a greater variance in this example. Thus, the window adjuster 132 may adjust the vertical duty cycle more frequently and/or to cause a wider vertical window during the scan cycle. Thus, in this example, the vertical duty cycle and the horizontal duty cycle may have different values. Further, in this example, the horizontal duty cycle may be smaller than the vertical duty cycle as there is less expectation for a change in horizontal position than a change in vertical position.

Also, in some examples, the dimension of the mobile device 104 may be greater in one dimension than another, which can be used to change the horizontal and/or vertical duty cycles. For example, if the mobile device is taller than it is wide, the vertical duty cycle may be longer than the horizontal duty cycle to scan a relatively larger vertical area than a horizontal area. Likewise, if the mobile device is wider than it is tall, the horizontal duty cycle may be longer than the vertical duty cycle to scan a relatively larger horizontal area than a vertical area.

In some examples, the window adjuster 132 may adjust the scan parameter based on the size and/or apparent size of the mobile unit 104. For example, as the mobile unit 104 moves closer to the base station 102, the mobile unit 104 will appear larger, and as the mobile unit 104 moves further from the base station 102, the mobile unit 104 will appear smaller. The window adjuster 132 may adjust the scan parameter to scan a relatively larger subspace of the physical area or a relatively longer scan time for a larger appearing mobile unit 104 than a small appearing mobile unit 104.

Also, in some examples, there may be one or more additional or secondary objects in the mapped physical space including, for example, additional mobile units, controllers, sensors, and/or other objects that also include a photodetector to receive light signals from the light source 106. In such examples, the base station 102 may obtain coordinate and/or other position information from the secondary objects, which may be used by the window adjuster 132 to adjust scan parameters to increase a scan area to encompass the mobile unit 104 and the secondary objects. Additionally or alternatively, the window adjuster 132 may use the additional coordination and/or other position information from the secondary objects to create a second window to incorporate the movement and position of the secondary objects in the scan.

Figure 2A:
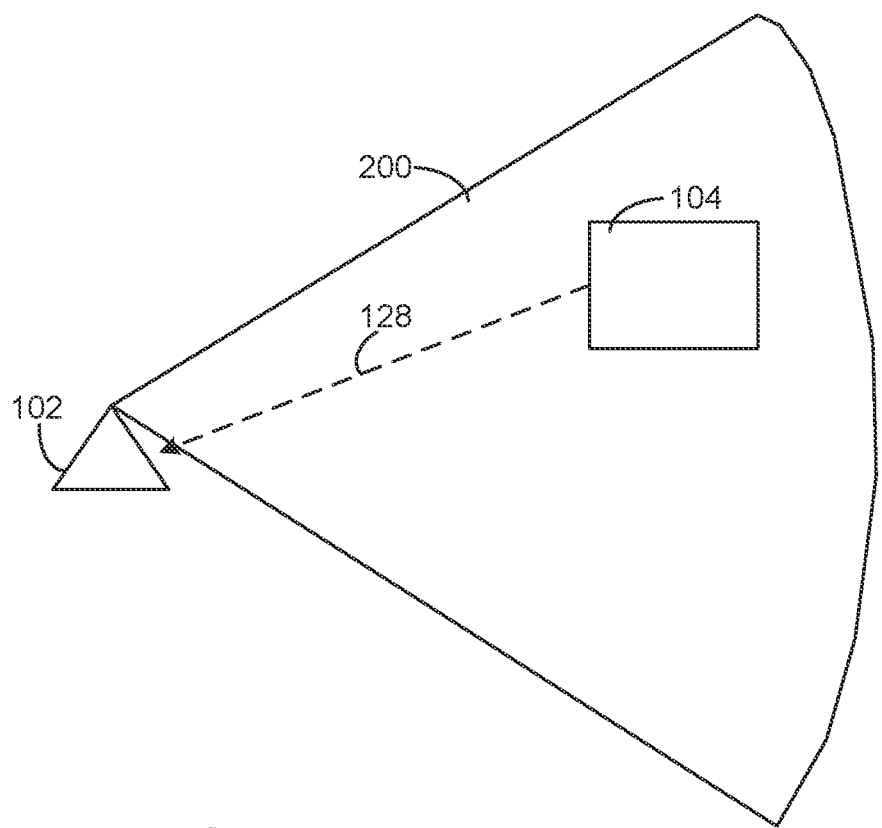
FIG. 2A is a schematic illustration of an example active scan region of the system of FIG. 1.
Figure 2B:
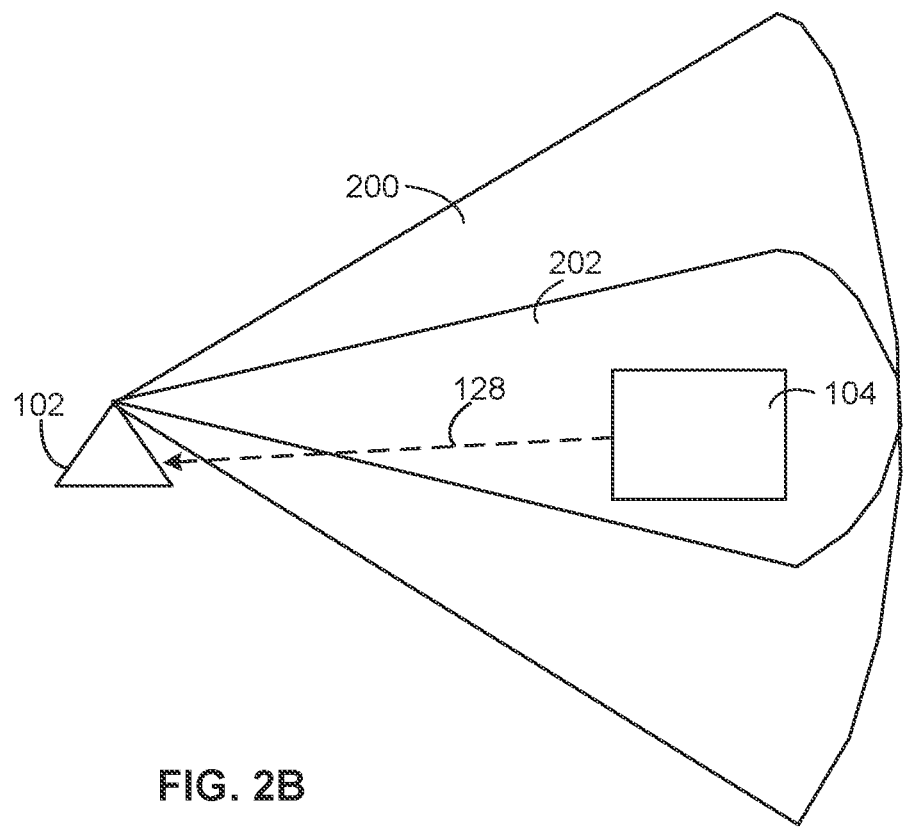
FIG. 2B is a schematic illustration of the region of FIG. 2A with a reduced active scan region.

FIG. 2A shows an example environment or physical space or area 200 that is scanned by the base station 102. The physical area 200 of FIG. 2A represents a full scan where the window adjuster 132 has not altered or reduced a scan parameter. FIG. 2B shows an example in which the window adjuster 132 has reduced a scan parameter so that only a focused region or subspace 202 of the physical area 200 is scanned by the light sources 106. The focused region is a window around the last known position of the mobile unit 104 based on information provided by the mobile unit 104 to the base station 102 via the communications channel 128. Thus, FIG. 2B illustrates an optimized scan.

In some examples, the window adjuster 132 determines the scan parameter and thus, the subspace 202 to be scanned, based also on a projected position of the mobile unit 104. For example, the historical data related to the position of the mobile unit 104 may indicate a path of motion from which vectors and/or a trajectory can be calculated or otherwise assumed. In other examples, there may be a history of a user making a specific move or sequence of moves. In such examples, the window adjuster 132 can adjust a scan parameter to include a scan of a subspace of the physical that encompasses a projected position of the mobile unit 104.

Figure 3A:
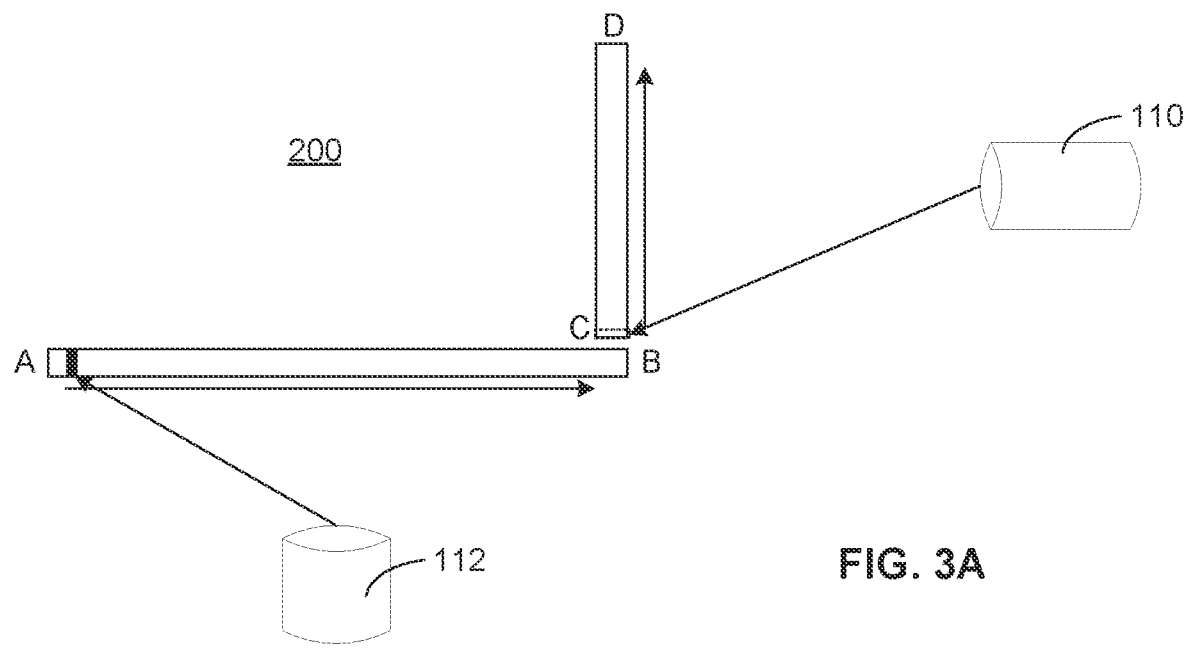
FIG. 3A is a schematic illustration of example full scans of an example light source of the example system of FIG. 1.
Figure 3B:
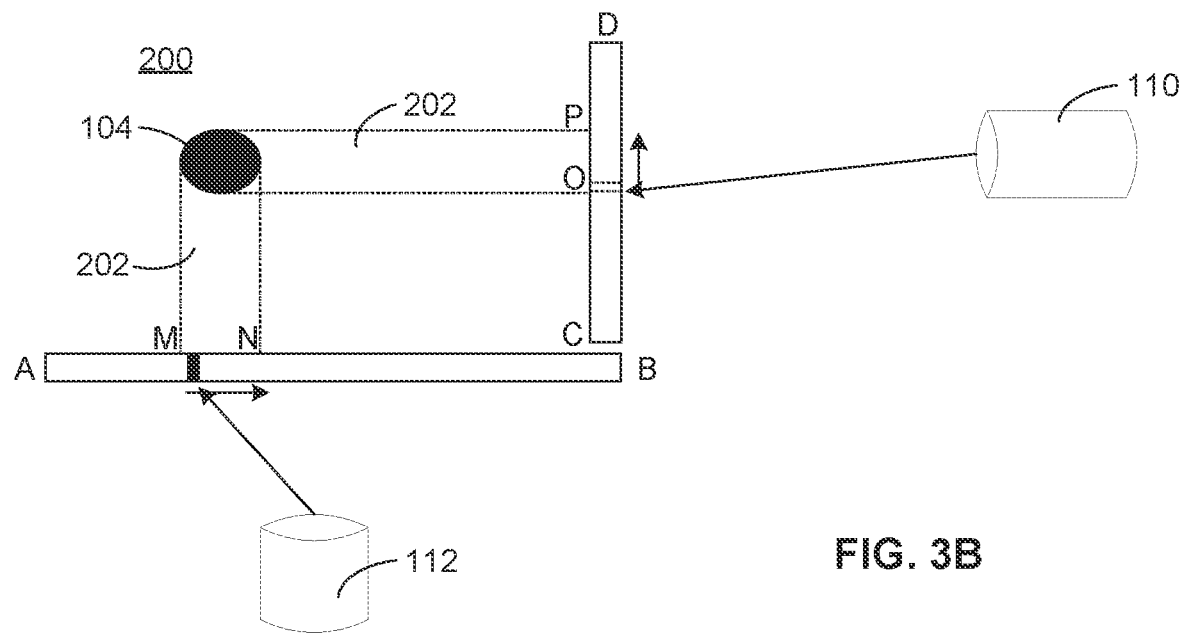
FIG. 3B is a schematic illustration of example reduced scans of the example light source of the example system of FIG. 1.

FIG. 3A is a schematic illustration of example full scans of the light source 106 of the example system of FIG. 1. FIG. 3B is a schematic illustration of example reduced scans of the light source 106. As shown in FIG. 3A, during a scan of the full physical area 200, the horizontal laser 112 has a horizontal sweep across the physical area 200, from point A to point B. This defines the horizontal area swept. The scan cycle time for the horizontal sweep and the duty cycle in the horizontal direction can be determined by:

$$T_H = T_{HON\_AS} + T_{HOFF\_AS}$$

$$(\text{Duty Cycle})_H = T_{HON\_AS}/(T_{HON\_AS} + T_{HOFF\_AS})$$

$T_{HON\_AS}$ represents the switch on time for the horizontal laser 112 during a full scan, and $T_{HOFF\_AS}$ represents the switch off time for the horizontal laser 112 during a full scan.

Also, for the vertical sweep, FIG. 3A shows the vertical laser 110 has a vertical sweep across the physical area 200, from point C to point D. This defines the vertical area swept. The scan cycle time for the vertical sweep and the duty cycle in the vertical direction can be determined by:

$$T_V = T_{VON\_AS} + T_{VOFF\_AS}$$

$$(\text{Duty Cycle})_V = T_{VON\_AS}/(T_{VON\_AS} + T_{VOFF\_AS})$$

$T_{VON\_AS}$ represents the switch on time for the vertical laser 110 during a full scan, and $T_{VOFF\_AS}$ represents the switch off time for the vertical laser 112 during a full scan. In addition, in this example, the total scan time between synchronization flashes emitted by the flash 108 can be determined by:

$$T = (T_{HON\_AS} + T_{HOFF\_AS}) \text{ or } (T_{VON\_AS} + T_{VOFF\_AS})$$

The off time for each horizontal sweep includes the on time for the vertical sweep and two synchronization flashes of the light signal produced by the flash 108 between each horizontal and vertical sweep. Similarly, the off time for each vertical sweep includes the on time for the horizontal sweep and two synchronization flashes of the light signal produced by the flash 108 between each horizontal and vertical sweep.

FIG. 3B is a schematic illustration of reduced scans or optimized scans of the light source 106 of the example system of FIG. 1. As shown in FIG. 3B, during a reduced scan of the full physical area 200, the horizontal laser 112 has a horizontal sweep across the subspace 202 of the physical area 200, from point M to point N. This defines the horizontal area swept during the optimized scan. The scan cycle time for the horizontal sweep and the duty cycle in the horizontal direction during the optimized scan can be determined by:

$$T_H = T_{HON\_OAS} + T_{HOFF\_OAS}$$

$$(\text{Duty Cycle})_H = T_{HON\_OAS}/(T_{HON\_OAS} + T_{HOFF\_OAS})$$

$T_{HON\_OAS}$ represents the switch on time for the horizontal laser 112 during an optimized scan of the subspace 202, and $T_{HOFF\_OAS}$ represents the switch off time for the horizontal laser 112 during the optimized scan.

Also, for the vertical sweep, FIG. 3B shows the vertical laser 110 has a vertical sweep across the subspace 202 of the physical area 200, from point O to point P. This defines the vertical area swept during the optimized scan. The scan cycle time for the vertical sweep and the duty cycle in the vertical direction during the optimized scan can be determined by:

$$T_V = T_{VON\_OAS} + T_{VOFF\_OAS}$$

$$(\text{Duty Cycle})_V = T_{VON\_OAS}/(T_{VON\_OAS} + T_{VOFF\_OAS})$$

$T_{VON\_OAS}$ represents the switch on time for the vertical laser 110 during an optimized scan of the subspace 202, and $T_{VOFF\_OAS}$ represents the switch off time for the vertical laser 112 during the optimized scan. In addition, in this example, the total scan time between synchronization flashes emitted by the flash 108 can be determined by:

$$T = (T_{HON\_OAS} + T_{HOFF\_OAS}) \text{ or } (T_{VON\_OAS} + T_{VOFF\_OAS})$$

As with a normal scan, in an optimized scan, the off time for each horizontal sweep includes the on time for the vertical sweep and two synchronization flashes of the light signal produced by the flash 108 between each horizontal and vertical sweep. Similarly, the off time for each vertical sweep includes the on time for the horizontal sweep and two synchronization flashes of the light signal produced by the flash 108 between each horizontal and vertical sweep.

During the optimized scan, based on the coordinates (position data) sent by the mobile unit 104 back to the base station 102, the window adjuster 132 of the base station 102 modifies its scan region as shown in FIG. 3B to scan only around or in a window around the mobile unit 104. However, for the mobile unit 104 to use the same timing logic, the total scan time (between synchronization flashes of the flash 108) should be the same. Therefore, in some examples, the optimized horizontal sweep cycle ($T_{HON\_OAS} + T_{HOFF\_OAS}$) will be the same as the normal horizontal sweep cycle ($T_{HON\_AS} + T_{HOFF\_AS}$). Similarly, the optimized vertical scan sweep cycle ($T_{VON\_OAS} + T_{VOFF\_OAS}$) will be the same as the normal vertical sweep cycle ($T_{VON\_AS} + T_{VOFF\_AS}$). Therefore, the horizontal and vertical scan or sweep cycles will be the same in the normal scan and in the optimized scan.

In examples disclosed herein, the optimized laser ON times in the horizontal and vertical directions are less than the normal scenario, which results in the respective laser OFF times being greater in the optimized scan than a normal scan:

$$T_{VON\_OAS} < T_{VON\_AS}$$

$$T_{HON\_OAS} < T_{HON\_AS}$$

$$T_{VOFF\_OAS} > T_{VOFF\_AS}$$

$$T_{HOFF\_OAS} > T_{HOFF\_AS}$$

In the optimized scan, the vertical laser 110 is powered off for a longer period of time than during a normal scan, and the horizontal laser 112 is powered off for a longer period of time than during a normal scan. Thus, these examples allow for power optimization, that is power reduction, while maintaining mapping of the mobile unit 104 in the physical area 200. The power reduction can be determined by:

$$P_{AS} - (P_{OAS} + P_{CHANNEL})$$

$P_{AS}$ denotes the power used in a normal scan. $P_{OAS}$ is the reduced power used in an optimized scan, and $P_{CHANNEL}$ represents the power used to maintain the communications channel 128. With low power communication means including, for example, Bluetooth or Zigbee, the power used to maintain the communications channel 128 would be insignificant.

Figure 4A:
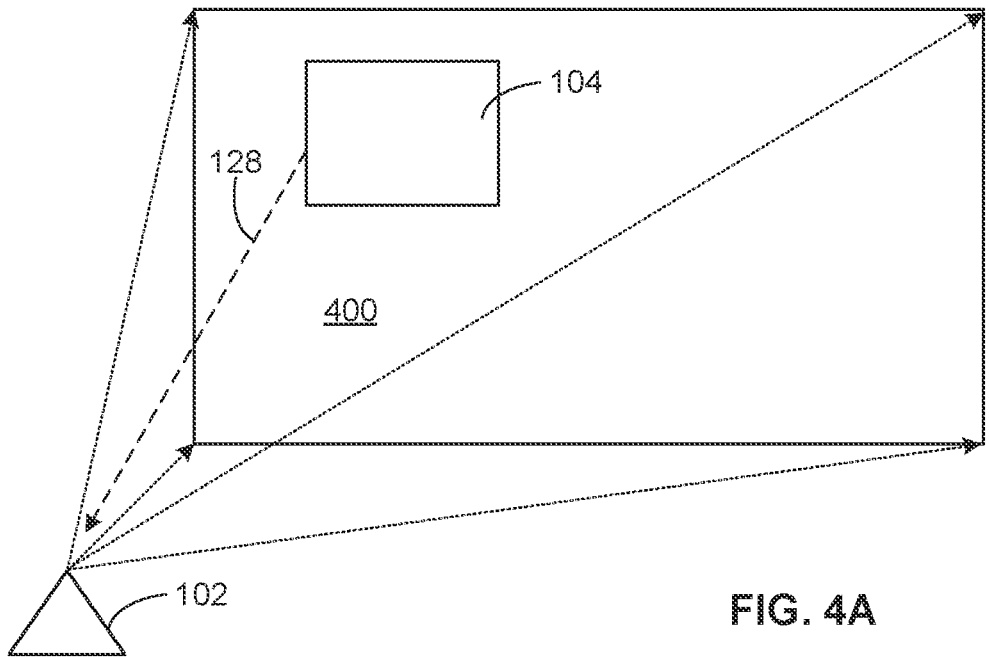
FIG. 4A is a schematic illustration of another example active scan region of the system of FIG. 1.
Figure 4B:
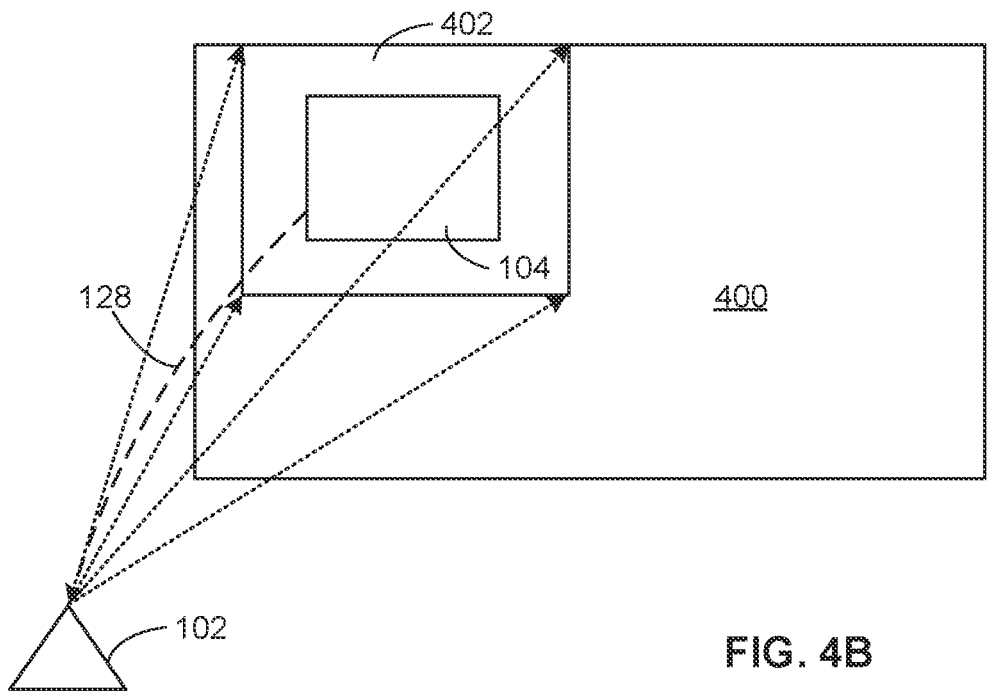
FIG. 4B is a schematic illustration of the region of FIG. 3A with a reduced active scan region.

FIG. 4A shows another example environment or physical space or area 400 that is scanned by the base station 102. The physical area 400 of FIG. 4A represents a full scan where the window adjuster 132 has not altered or reduced a scan parameter. FIG. 4B shows an example in which the window adjuster 132 has reduced a scan parameter so that only a focused region or subspace 402 of the physical area 400 is scanned by the light sources 106. The focused region is a window around the last known position of the mobile unit 104 based on information provided by the mobile unit 104 to the base station 102 via the communications channel 128. Thus, FIG. 4B illustrates an optimized scan.

In FIG. 4A, the scan area is bound to a rectangular shape. In other examples, areas with other shapes may be scanned (e.g., FIG. 2A). In addition, in some examples, the scan area is a 3-D space such as, for example, a cube. In such examples, the optimized scan area may be a cone or a pyramid in the scan space with the apex at the base station 102.

While an example manner of implementing the LiDAR scan reduction system 100 is illustrated in FIG. 1, one or more of the elements, processes and/or devices illustrated in FIG. 1 may be combined, divided, re-arranged, omitted, eliminated and/or implemented in any other way. For example, one or more of the elements of the base station 102 may be implemented in the mobile unit 104, and vice versa. Further, the example light sources 106, the example optical receiver 114, the example mapper 116, the example clock 118, the example photodetector 120, the example position calculator 122, the example clock 124, the example transceiver 126, the example transceiver 130, the example window adjuster 132, and/or, more generally, the base station 102, the example mobile unit 104, and/or the example LiDAR scan reduction system 100 of FIG. 1 may be implemented by hardware, software, firmware and/or any combination of hardware, software and/or firmware. Thus, for example, any of the example light sources 106, the example optical receiver 114, the example mapper 116, the example clock 118, the example photodetector 120, the example position calculator 122, the example clock 124, the example transceiver 126, the example transceiver 130, the example window adjuster 132, and/or, more generally, the base station 102, the example mobile unit 104, and/or the example LiDAR scan reduction system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example base station 102, the example mobile unit 104, the example light sources 106, the example optical receiver 114, the example mapper 116, the example clock 118, the example photodetector 120, the example position calculator 122, the example clock 124, the example transceiver 126, the example transceiver 130, and/or the example window adjuster 132 is/are hereby expressly defined to include a non-transitory computer readable storage device or storage disk such as a memory, a digital versatile disk (DVD), a compact disk (CD), a Blu-ray disk, etc. including the software and/or firmware. Further still, the example LiDAR scan reduction system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
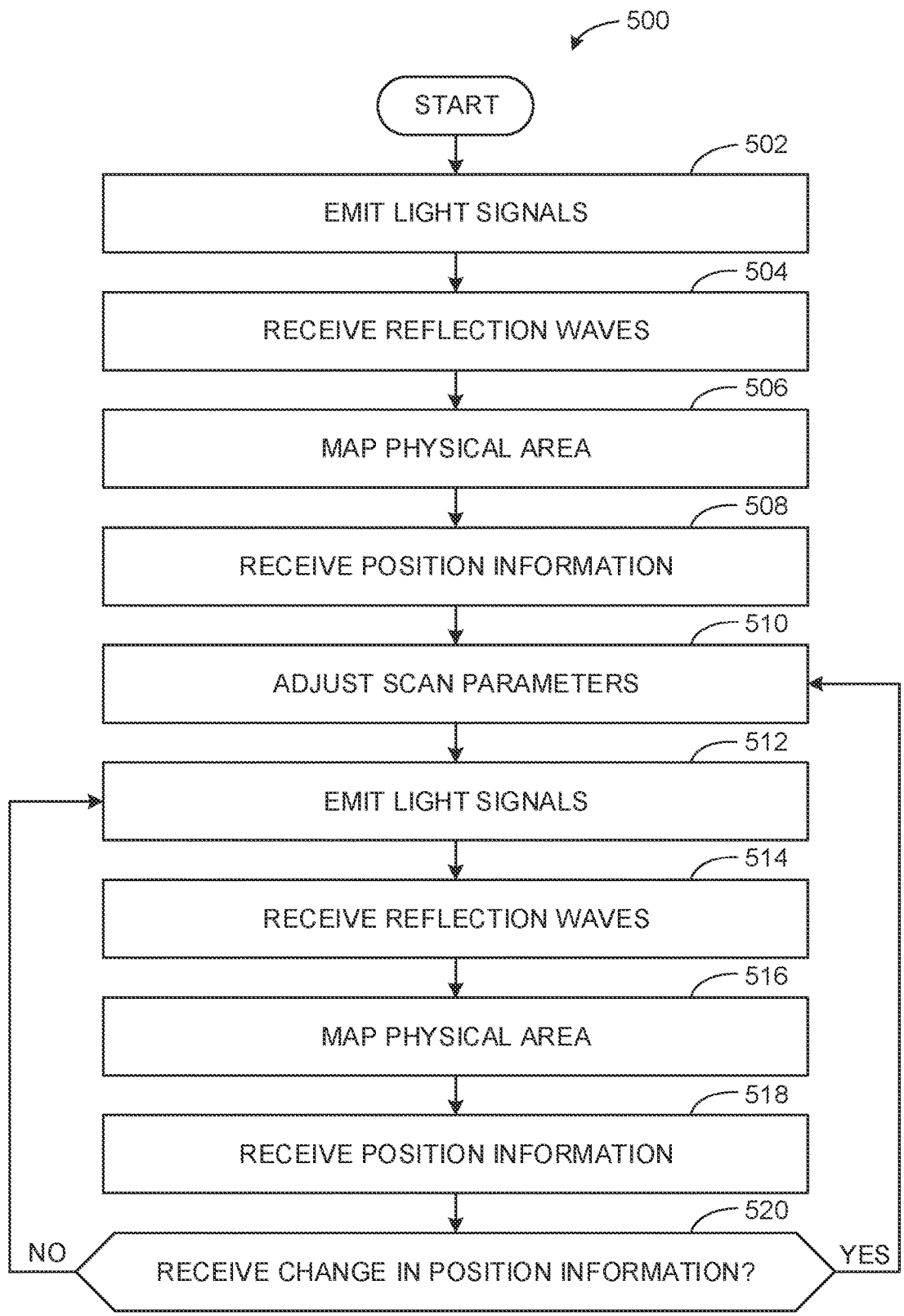
FIG. 5 is a flowchart representative of machine readable instructions which may be executed to implement an example base station of the example system of FIG. 1.
Figure 6:
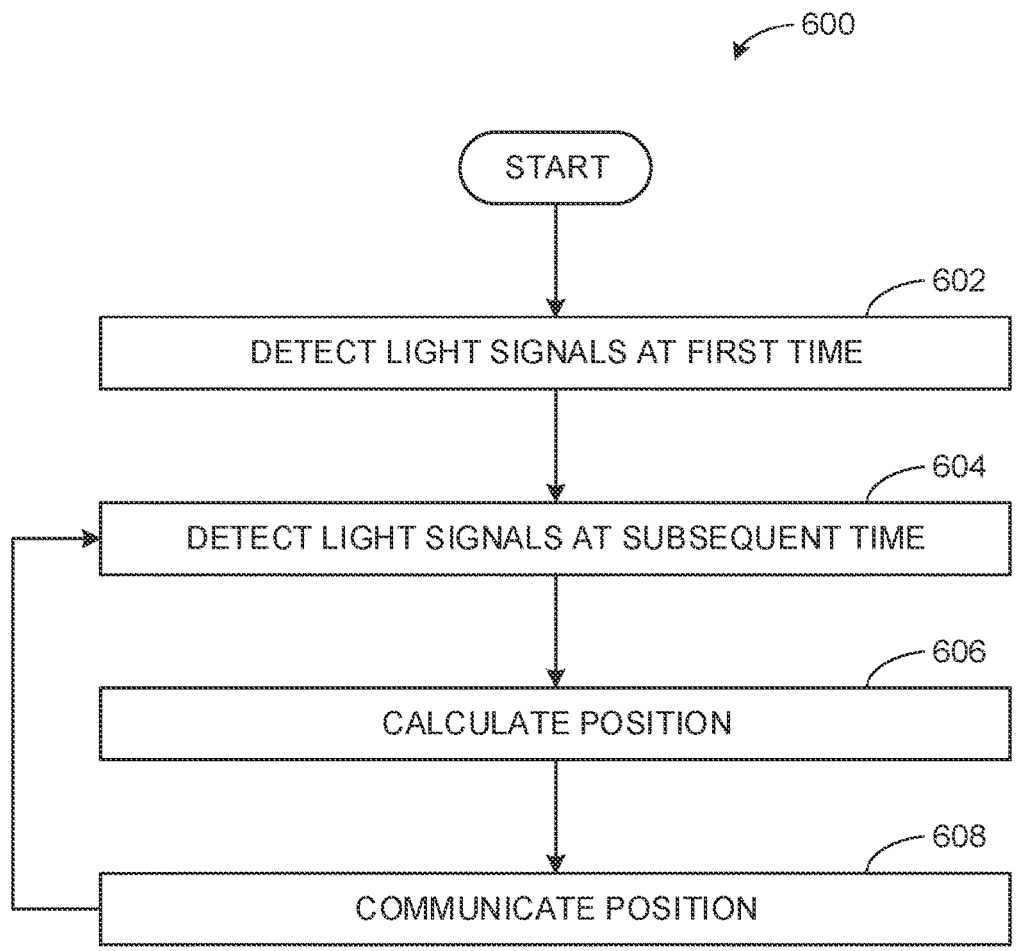
FIG. 6 is a flowchart representative of machine readable instructions which may be executed to implement an example mobile unit of the example system of FIG. 1.

Flowcharts representative of example hardware logic, machine readable instructions, hardware implemented state machines, and/or any combination thereof for implementing the base station 102 and mobile unit 104 of FIG. 1 are shown in FIGS. 5 and 6, respectively. The machine readable instructions may be an executable program or portion of an executable program for execution by a computer processor such as the processors 712 and/or 612 shown in the example processor platforms 700 and/or 800 discussed below in connection with FIGS. 7 and/or 8. The programs may be embodied in software stored on a non-transitory computer readable storage medium such as a CD-ROM, a floppy disk, a hard drive, a DVD, a Blu-ray disk, or a memory associated with the processors 712, 812, but the entire program and/or parts thereof could alternatively be executed by a device other than the processor 712, 812 and/or embodied in firmware or dedicated hardware. Further, although the example programs are described with reference to the flowcharts illustrated in FIGS. 5 and 6, many other methods of implementing the example base station 102 and/or mobile unit 104 may alternatively be used. For example, the order of execution of the blocks may be changed, and/or some of the blocks described may be changed, eliminated, or combined. In some examples, one or more of the blocks of the process 500 of FIG. 5 may be implemented in the process 600 of FIG. 6 and vice versa. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program 500 of FIG. 5 may be implemented by the base station 102 to effect LiDAR scan reduction. In the program 500, the base station 102 uses the light source 106 to emit light signals such as, for example, a flash from the flash 108 and laser pulses from the vertical laser 110 and/or horizontal laser 112 to the physical area 200, 400 (block 502). In some examples, the light signals are emitted continuously and periodically.

The optical receiver receives reflection waves from light signals that are reflected off of objects in the physical area 200, 400 (block 504). The mapper 116 maps the physical area 200, 400 based on the reflection waves (block 506).

The transceiver 130 of the base station 102 also receives position information including, for example, coordinates from the mobile unit 104 via the communications channel 128 (block 508). The position information is indicative of the position of the mobile unit. The window adjuster 132 uses the position information from the mobile unit 104 to adjust a scan parameter (block 510). For example, the window adjuster 132 changes a duty cycle of the vertical laser 110 and/or the horizontal laser 112 to adjust or focus a scan region to a window or area around the mobile unit 104 such as, for example, the subspace 202, 402, which is less than the physical area 200, 400.

The light source 106 emits light signals (block 512) in accordance with the adjusted scan parameters set by the window adjuster 132. The example program 500 continues with the optical receiver 114 receiving reflection waves (block 514) from light signals that are reflected off of objects in the subspace 202, 402. The mapper 116 maps the subspace 202, 402 of the physical area 200, 400 based on the reflection waves (block 516).

The example program 500 also includes the transceiver 130 of the base station 102 receiving additional position information from the mobile unit 104 (block 518). The window adjuster 132 determines if there is a change in the position information provided by the mobile unit 104 (block 520). If there has been no change in the position information, the base station 102 continues to emit light from the light source 106 (block 512) for continual mapping of the subspace 202, 402. If, however, the window adjuster 132 determines that there has been a change in position information from the mobile unit 104, the window adjuster 132 again adjusts one or more scan parameters (block 510). The updated scan parameters are set by the window adjuster 132 to focus the scan window around the updated position of the mobile unit 104. The example program 500 can continue with additional updated scan parameters as information is delivered to the base station 102 by the mobile unit 104.

The program 600 of FIG. 6 may be implemented by the mobile unit 104 to effect LiDAR scan reduction. In the program 600, the mobile unit 104 detects, via the photodetector 120, light signals at a first point in time (block 602). In this example, the light signals are, a flash from the flash 108 and laser pulses from the vertical laser 110 and/or horizontal laser 112 of the light source 106 of the base station 102. The program 600 also includes the photodetector 120 detecting light signals from the light source 106 of the base station 102 at a second or subsequent time (block 604).

The position calculator 122 determines coordinates and/or other position information of the mobile unit (block 606) based on the detected light signals. For example, the position calculator 122 uses time data from the clock 124 indicative of the time of detection of the light signals at the first time and the subsequent and information related to the wavelength of the light emitted from the light source 106 to calculate the position information of the mobile unit 104 (block 606).

The transceiver 126 of the mobile unit 104 communicates the position information (block 608) via, for example, the communication channel 128 to the base unit 102. The program 600 continues with further detection of light signals from the base station 102 at subsequent times (block 604). The program 600 thus continuously and/or periodically determines updated position information for communication to the base unit 102.

Figure 7:
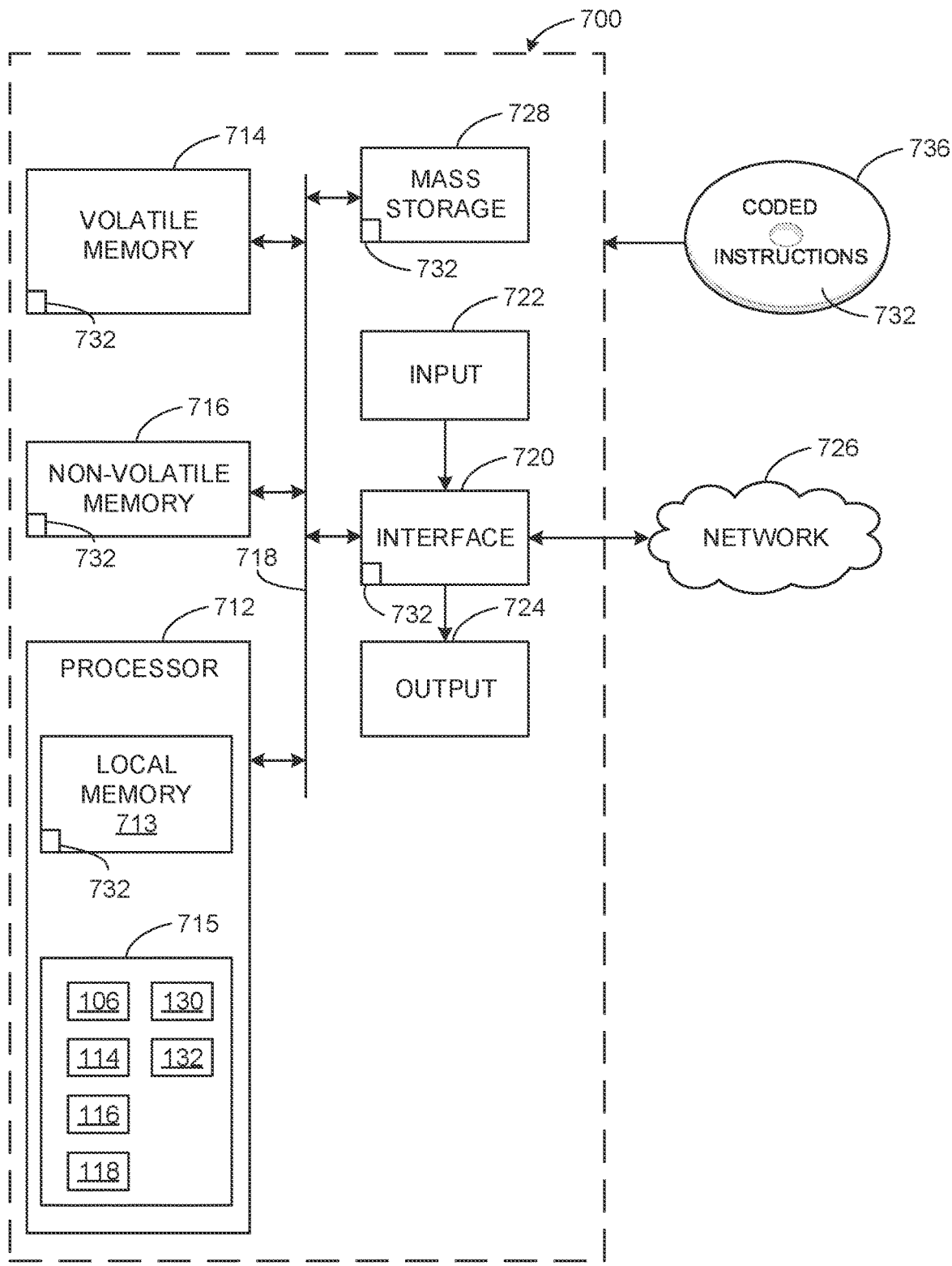
FIG. 7 is a block diagram of an example processing platform structured to execute the instructions of FIG. 4 to implement the example base station of the example system of FIG. 1.
Figure 8:
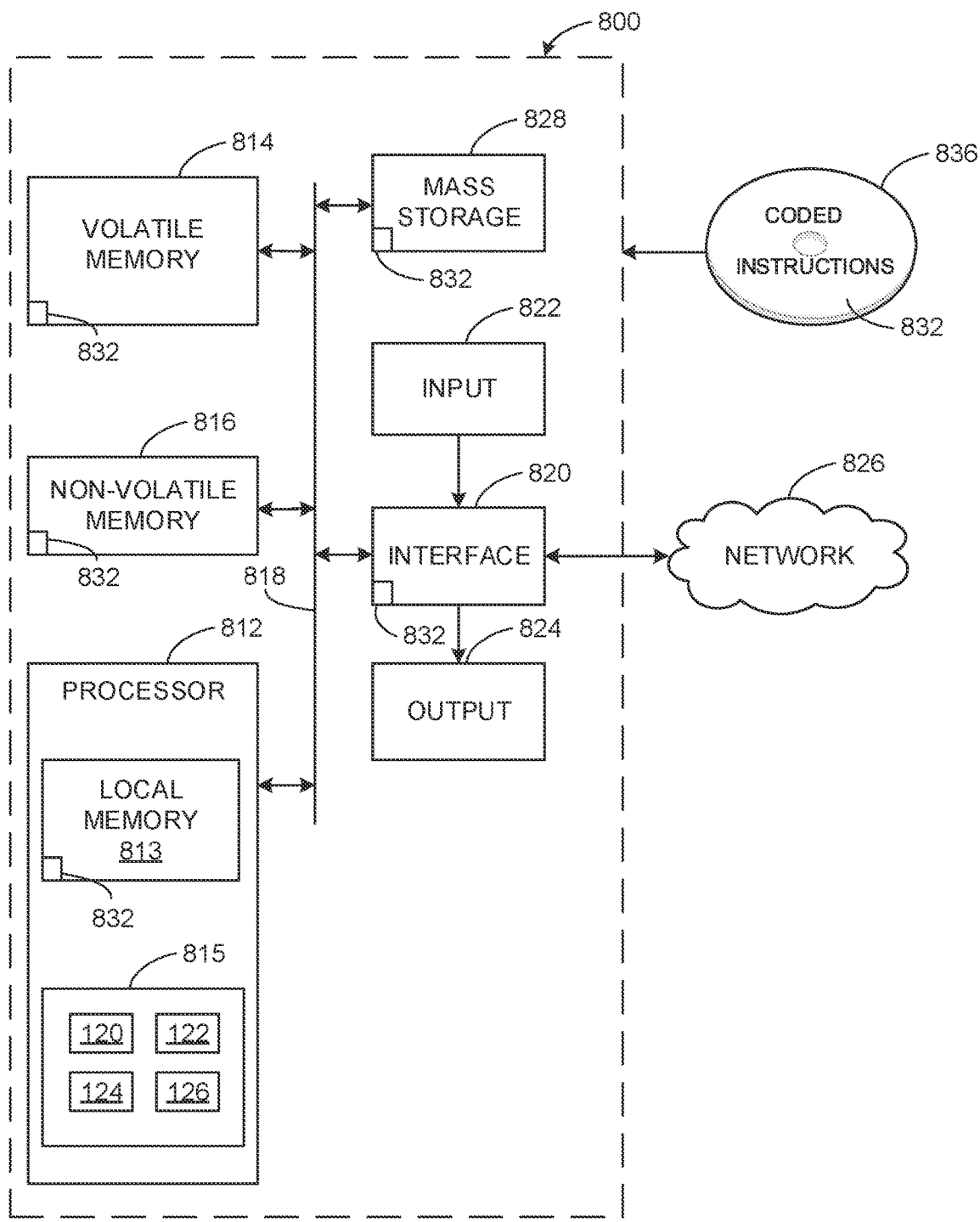
FIG. 8 is a block diagram of an example processing platform structured to execute the instructions of FIG. 5 to implement the example mobile of the example system of FIG. 1.

FIG. 7 is a block diagram of an example processor platform 700 structured to execute the instructions of FIG. 5 to implement the base station 102 of FIG. 1. FIG. 8 is a block diagram of an example processor platform 800 structured to execute the instructions of FIG. 6 to implement the mobile unit 104 of FIG. 1. The processor platforms 700, 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray® player, a gaming console, a personal video recorder, a set top box, a headset or other wearable device, or any other type of computing device.

The processor platforms 700, 800 of the illustrated examples include respective processors 712, 812. The processors 712, 812 of the illustrated examples are hardware. For example, the processors 712, 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 700 implements the light sources 106, the optical receiver 114, the mapper 116, the clock 118, the transceiver 130, and the window adjuster 132. Also, in this example, the processor 800 implements the photodetector 120, the position calculator 122, the clock 124, and the transceiver 126.

The processors 712, 812 of the illustrated examples include respective local memory 713, 813 (e.g., a cache). The processors 712, 812 of the illustrated examples are in communication with respective main memory including volatile memory 714, 814 and non-volatile memory 716, 816 via respective busses 718, 818. The volatile memory 714, 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716, 816 may be implemented by flash memory and/or any other desired type of memory device. Access to the main memory 714, 716, 814, 816 is controlled by a memory controller.

The processor platforms 700, 800 of the illustrated examples also include a respective interface circuit 720, 820. The interface circuit 720, 820 may be implemented by any type of interface standard, such as an Ethernet interface, a universal serial bus (USB), a Bluetooth® interface, a near field communication (NFC) interface, and/or a PCI express interface.

In the illustrated examples, one or more input devices 722, 822 are connected to the respective interface circuits 720, 820. The input device(s) 722, 822 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724, 824 are also connected to the respective interface circuits 720, 820 of the illustrated examples. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuits 720, 820 of the illustrated examples, thus, typically include a graphics driver card, a graphics driver chip and/or a graphics driver processor.

The interface circuits 720, 820 of the illustrated example also include a communication device such as a transmitter, a receiver, a transceiver, a modem, a residential gateway, a wireless access point, and/or a network interface to facilitate exchange of data with external machines (e.g., computing devices of any kind) via respective networks 726, 826. The communication can be via, for example, an Ethernet connection, a digital subscriber line (DSL) connection, a telephone line connection, a coaxial cable system, a satellite system, a line-of-site wireless system, a cellular telephone system, etc.

The processor platforms 700, 800 of the illustrated example also include one or more mass storage devices 728, 828 for storing software and/or data. Examples of such mass storage devices 728, 828 include floppy disk drives, hard drive disks, compact disk drives, Blu-ray disk drives, redundant array of independent disks (RAID) systems, and digital versatile disk (DVD) drives.

The machine executable instructions 732 of FIG. 5 and the machine executable instructions 832 of FIG. 6 may be stored in the respective mass storage devices 728, 828, in the respective volatile memories 714, 814, in the respective non-volatile memories 716, 816, and/or on one or more removable non-transitory computer readable storage media such as a CD or DVD.

From the foregoing, it will be appreciated that example systems, apparatus, articles of manufacture, and methods have been disclosed that can optimize LiDAR scan by, for example a reduction in the area scanned or duty cycle of one or more laser(s) or other light sources that are used to scan a physical area. The LiDAR scan reduction will provide direct benefit to the power consumed and increase battery life of the base station that houses the light sources used in the scan.

Example 1 is a system to reduce a LiDAR scan. The example system includes a light source to broadcast a light signal and a window adjuster to set a scan parameter for the light signal. The system of Example 1 also includes a transceiver to receive communication indicative of a physical position of a mobile unit. In addition, the window adjuster is to adjust the scan parameter based on the physical position.

Example 2 includes the system of Example 1, wherein the scan parameter defines a physical area to be scanned and the window adjuster is to adjust the scan parameter to define a subspace of the physical area to be scanned.

Example 3 includes the system of Examples 1 or 2, wherein the transceiver is a first transceiver, the system further including a base station including the light source, the window adjuster, and the first transceiver. The system of Example 3 also includes a mobile unit including a photodetector to detect the light signal, a position calculator to determine the physical position of the mobile unit based on the light signal, and a second transceiver to communicate the physical position to the base station.

Example 4 includes the system of Example 3, wherein the light signal includes a first laser pulse and a second laser pulse, and the scan parameter includes a first scan parameter for the first laser pulse and a second scan parameter for the second laser pulse, the positioner calculator to determine the physical position based on the first laser pulse and the second laser pulse.

Example 5 includes the system of Example 4, wherein the first scan parameter is a first duty cycle of the first laser pulse and the second scan parameter is a second duty cycle of the second laser pulse.

Example 6 includes the system of Example 5, wherein the second duty cycle is different than the first duty cycle.

Example 7 includes the system of Examples 4-6, wherein the first laser pulse is to scan a physical area horizontally and the second laser pulse is to scan the physical area vertically.

Example 8 includes the system of Example 6, wherein the second duty cycle is less than the first duty cycle.

Example 9 includes the system of Example 8, wherein the light signal is a first light signal, the scan parameter is a first scan parameter, the physical position is a first physical position, and the adjusted scan parameter is a second scan parameter. In Example 9, the light source is to broadcast a second light signal in accordance with the second scan parameter, the light source having a scan cycle time between the broadcast of the first light signal and the broadcast of the second light signal. In Example 9, the photo detector is to detect the second light signal, and the position calculator is to determine a second physical position of the mobile unit based on the second light signal. Example 9 also includes a second transceiver to communicate the second physical position to the base station, wherein the window adjuster is to adjust the second scan parameter to a third scan parameter based on the second physical position. In Example 9, the light source is to broadcast a third light signal in accordance with the second scan parameter while maintaining the scan cycle.

Example 10 is a system to reduce a LiDAR scan. The system of Example 10 includes means for broadcasting a light signal and means for setting a scan parameter for the light signal. In addition, the system of Example 10 includes means for detecting the light signal and means for determining a physical position of a mobile unit based on the light signal, wherein the means for setting the scan parameter is to adjust the scan parameter based on the physical position.

Example 11 includes the system of Example 10, wherein the scan parameter defines a physical area to be scanned and the means for setting the scan parameter is to adjust the scan parameter to define a subspace of the physical area to be scanned.

Example 12 includes the system of Example 10, wherein the light signal includes a first laser pulse and a second laser pulse, and the scan parameter includes a first scan parameter for the first laser pulse and a second scan parameter for the second laser pulse, the means for determining a physical position to determine the physical position based on the first laser pulse and the second laser pulse.

Example 13 includes the system of Example 12, wherein the first scan parameter is a first duty cycle of the first laser pulse and the second scan parameter is a second duty cycle of the second laser pulse.

Example 14 includes the system of Example 13, wherein the second duty cycle is different than the first duty cycle.

Example 15 includes the system of Examples 13 or 14, wherein the first laser pulse is to scan a physical area horizontally and the second laser pulse is to scan the physical area vertically.

Example 16 includes the system of Example 15, wherein the second duty cycle is less than the first duty cycle.

Example 17 includes the system of Example 10, wherein the light signal is a first light signal, the scan parameter is a first scan parameter, the physical position is a first physical position, and the adjusted scan parameter is a second scan parameter. In Example 17, the means for broadcasting a light signal is to broadcast a second light signal in accordance with the second scan parameter, the means for broadcasting a light signal having a scan cycle time between the broadcast of the first light signal and the broadcast of the second light signal. Also in Example 17, the means for detecting the light signal is to detect the second light signal, and the means for determining a physical position is to determine a second physical position of the mobile unit based on the second light signal. Also, in Example 17, the means for setting a scan parameter is to adjust the second scan parameter to a third scan parameter based on the second physical position, and the means for broadcasting a light signal is to broadcast a third light signal in accordance with the second scan parameter while maintaining the scan cycle.

Example 18 is a non-transitory computer readable storage medium comprising computer readable instructions that, when executed, cause one or more machines to, at least broadcast a light signal, set a scan parameter for the light signal, detect the light signal, determine a physical position of a mobile unit based on the light signal, and adjust the scan parameter based on the physical position.

Example 19 includes the medium of Example 18, wherein the scan parameter defines a physical area to be scanned and wherein the computer readable instructions, when executed, further cause the one or more machines to adjust the scan parameter to define a subspace of the physical area to be scanned.

Example 20 includes the medium of Example 18, wherein the light signal includes a first laser pulse and a second laser pulse, and the scan parameter includes a first scan parameter for the first laser pulse and a second scan parameter for the second laser pulse, and wherein the computer readable instructions, when executed, further cause the one or more machines to determine the physical position based on the first laser pulse and the second laser pulse.

Example 21 includes the medium of Example 18, wherein the first scan parameter is a first duty cycle of the first laser pulse and the second scan parameter is a second duty cycle of the second laser pulse.

Example 22 includes the medium of Example 21, wherein the second duty cycle is different than the first duty cycle.

Example 23 includes the medium of Examples 21 or 22, wherein the first laser pulse is to scan a physical area horizontally and the second laser pulse is to scan the physical area vertically.

Example 24 includes the medium of Example 23, wherein the second duty cycle is less than the first duty cycle.

Example 25 includes the medium of Example 18, wherein the light signal is a first light signal, the scan parameter is a first scan parameter, the physical position is a first physical position, and the adjusted scan parameter is a second scan parameter. In Example 25, the computer readable instructions, when executed, further cause the one or more machines to broadcast a second light signal in accordance with the second scan parameter, the light source having a scan cycle time between the broadcast of the first light signal and the broadcast of the second light signal. In Example 25, the instructions further cause the one or more machines to detect the second light signal, determine a second physical position of the mobile unit based on the second light signal, adjust the second scan parameter to a third scan parameter based on the second physical position, and broadcast a third light signal in accordance with the second scan parameter while maintaining the scan cycle.

Example 26 is a method to reduce a LiDAR scan. Example 26 includes broadcasting a light signal from a light source of a base station, setting a scan parameter for the light signal, detecting the light signal at a mobile unit, determining a physical position of the mobile unit based on the light signal, communicating the physical position to the base station, and adjusting the scan parameter based on the physical position.

Example 27 includes the method of Example 26, wherein the scan parameter defines a physical area to be scanned, the method further including adjusting the scan parameter to define a subspace of the physical area to be scanned.

Example 28 includes the method of Example 26, wherein the light signal includes a first laser pulse and a second laser pulse, and the scan parameter includes a first scan parameter for the first laser pulse and a second scan parameter for the second laser pulse, the method further including determining the physical position based on the first laser pulse and the second laser pulse.

Example 29 includes the method of Example 28, wherein the first scan parameter is a first duty cycle of the first laser pulse and the second scan parameter is a second duty cycle of the second laser pulse.

Example 30 includes the method of Example 29, wherein the second duty cycle is different than the first duty cycle.

Example 31 includes the method of Examples 29 or 30, wherein the first laser pulse is to scan a physical area horizontally and the second laser pulse is to scan the physical area vertically.

Example 32 includes the method of Example 31, wherein the second duty cycle is less than the first duty cycle.

Example 33 includes the method of Example 26, wherein the light signal is a first light signal, the scan parameter is a first scan parameter, the physical position is a first physical position, and the adjusted scan parameter is a second scan parameter. In Example 33, the method also includes broadcasting a second light signal from the base station in accordance with the second scan parameter, the light source having a scan cycle time between the broadcast of the first light signal and the broadcast of the second light signal, detecting the second light signal at the mobile unit, determining a second physical position of the mobile unit based on the second light signal, communicating the second physical position to the base station, adjusting the second scan parameter to a third scan parameter based on the second physical position, and broadcasting a third light signal from the base station in accordance with the second scan parameter while maintaining the scan cycle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A surveying device comprising:
   a light source to broadcast a light signal;
   a transceiver to receive communication indicative of a physical position of a mobile unit;
   instructions; and
   processor circuitry to execute the instructions to:
      set a scan parameter for the light signal; and
      adjust the scan parameter based on the physical position of the mobile unit.

2. The device of claim 1, wherein the processor circuitry is to set the scan parameter to cause the light source to direct the light signal over a first subspace, and to adjust the scan parameter to cause the light source to direct the light signal over a second subspace different from the first subspace, the first subspace and the second subspace at least partially overlap.

3. The device of claim 2, wherein the light signal is to be broadcast over the first subspace at a first time and over the second subspace at a second time subsequent to the first time.

4. The device of claim 2, including a first laser to scan the first subspace from a first direction and a second laser to scan the first subspace from a second direction different from the first direction.

5. The device of claim 4, wherein the first direction is vertical and the second direction is horizontal.

6. The device of claim 4, wherein the first laser and the second laser operate at least partially simultaneously.

7. The device of claim 4, wherein the first laser has a first duty cycle and the second laser has a second duty cycle different than the first duty cycle.

8. The device of claim 1, wherein the light signal has a nonvisible wavelength.

9. The device of claim 1, wherein the light signal includes a first set of laser pulses and a second set of laser pulses, and the processor circuitry is to determine the physical position based on the first set of laser pulses and the second set of laser pulses.

10. The device of claim 1, wherein the first scan parameter includes a first vertical duty cycle and a first horizontal duty cycle, and the second scan parameter includes a second vertical duty cycle different than the first vertical duty cycle and a second horizontal duty cycle different than the first horizontal duty cycle.

11. The device of claim 1, wherein the first scan parameter includes a vertical duty cycle and a first horizontal duty cycle, and the second scan parameter includes the vertical duty cycle and a second horizontal duty cycle different than the first horizontal duty cycle.

12. The device of claim 1, wherein the first scan parameter includes a first vertical duty cycle and a horizontal duty cycle, and the second scan parameter includes a second vertical duty cycle different than the first vertical duty cycle and the horizontal duty cycle.

13. The device of claim 1, wherein the processor circuitry is to adjust the scan parameter based on a size of the mobile unit.

14. The device of claim 1, wherein the processor circuitry is to determine a distance between the device and the mobile unit and adjust the scan parameter based on the distance.

15. A non-transitory computer readable storage medium comprising computer readable instructions that, when executed, cause one or more machines to, at least:
   set a scan parameter for transmission of a light signal;
   determine a physical position of a mobile unit based on a reflection of the light signal; and
   adjust the scan parameter for the light signal based on the physical position of a mobile unit.

16. The storage medium of claim 15, wherein the light signal is to be transmitted over a first subspace at a first time and over a second subspace over a second time subsequent to the first time and subsequent to adjustment of the scan parameter.

17. The storage medium of claim 15, wherein the light signal includes a first set of laser pulses and a second set of laser pulses, and the instructions cause the one or more machines to determine the physical position based on the first set of laser pulses and the second set of laser pulses.

18. The storage medium of claim 15, wherein the first scan parameter includes a first vertical duty cycle and a first horizontal duty cycle, and the second scan parameter includes a second vertical duty cycle different than the first vertical duty cycle and a second horizontal duty cycle different than the first horizontal duty cycle.

19. The storage medium of claim 15, wherein the instructions cause the one or more machines to adjust the scan parameter based on a size of the mobile unit.

20. The storage medium of claim 15, wherein the instructions cause the one or more machines to determine a distance between the device and the mobile unit and adjust the scan parameter based on the distance.

* * * * *